United States Patent [19]
East et al.

[11] Patent Number: 5,339,418
[45] Date of Patent: Aug. 16, 1994

[54] MESSAGE PASSING METHOD

[75] Inventors: Jeffrey A. East, Aptos; Marilyn E. Fries, Redmond, both of Calif.

[73] Assignee: Digital Equipment Corporation, Maynard, Mass.

[21] Appl. No.: 168,577

[22] Filed: Dec. 16, 1993

Related U.S. Application Data

[63] Continuation of Ser. No. 939,392, Aug. 31, 1992, abandoned, which is a continuation of Ser. No. 374,099, Jun. 29, 1989, abandoned.

[51] Int. Cl.$^5$ ............................................. G06F 13/00
[52] U.S. Cl. ............................ 395/650; 364/DIG. 1; 364/284.3; 364/284
[58] Field of Search ................... 364/DIG. 1, DIG. 2

[56] References Cited

U.S. PATENT DOCUMENTS

| | | | |
|---|---|---|---|
| 4,320,455 | 3/1982 | Woods et al. | 364/200 |
| 4,369,494 | 1/1983 | Bienvenu et al. | 364/200 |
| 4,412,285 | 10/1983 | Neches et al. | 395/650 |
| 4,482,956 | 11/1984 | Tallman | 395/250 |
| 4,486,853 | 12/1984 | Parsons | 395/275 |
| 4,590,554 | 5/1986 | Glazer et al. | 364/200 |
| 4,615,001 | 9/1986 | Hudgins, Jr. | |
| 4,615,002 | 9/1986 | Innes | |
| 4,630,196 | 12/1986 | Bednar, Jr. et al. | |
| 4,649,473 | 3/1987 | Hammer et al. | |
| 4,660,144 | 4/1987 | Walsh | |
| 4,694,396 | 9/1987 | Weisshaar et al. | |
| 4,713,758 | 12/1987 | De Kelaita et al. | 371/15.1 |
| 4,769,771 | 9/1988 | Lippmann et al. | 395/200 |
| 4,905,138 | 2/1990 | Bourne | 395/650 |
| 5,023,772 | 6/1991 | King | 364/200 |
| 5,047,977 | 9/1991 | Hill et al. | 395/575 |
| 5,051,891 | 9/1991 | MacPhail | 364/200 |
| 5,060,150 | 10/1991 | Simor | 364/200 |

*Primary Examiner*—Gareth D. Shaw
*Assistant Examiner*—Lucien Toplu
*Attorney, Agent, or Firm*—Flehr, Hohbach, Test, Albritton & Herbert

[57] ABSTRACT

An apparatus is provided for passing respective messages from at least one writer process to multiple respective readers processes comprising: a storage buffer for storing a sequence of respective messages; and an access mechanism for providing respective multiple points of access for the respective reader processes to the sequence of respective messages; wherein for each of the multiple points of access, the access mechanism sequentially provides access to the respective messages of the sequence.

9 Claims, 12 Drawing Sheets

FIGURE 1

PRIOR ART

FIGURE 15B

MESSAGE PASSING METHOD

This is a continuation of application Ser. No. 07/939,392 filed Aug. 31, 1992, which is a continuation of application Ser. No. 07/374,099 filed Jun. 29, 1989, both now abandoned.

BACKGROUND OF THE INVENTION

1. Field of the Invention

The invention relates generally to interprocess communications within a computer system, and more particularly, to an apparatus and method for passing messages from one or more writer processes to multiple reader processes.

2. Description of the Related Art

Multiple processes often can execute simultaneously in a computer system. The execution of one process may depend upon the results of another process. Thus, it frequently is necessary to transfer messages about one process running in a computer system to another process running in the computer system.

Figure 1:
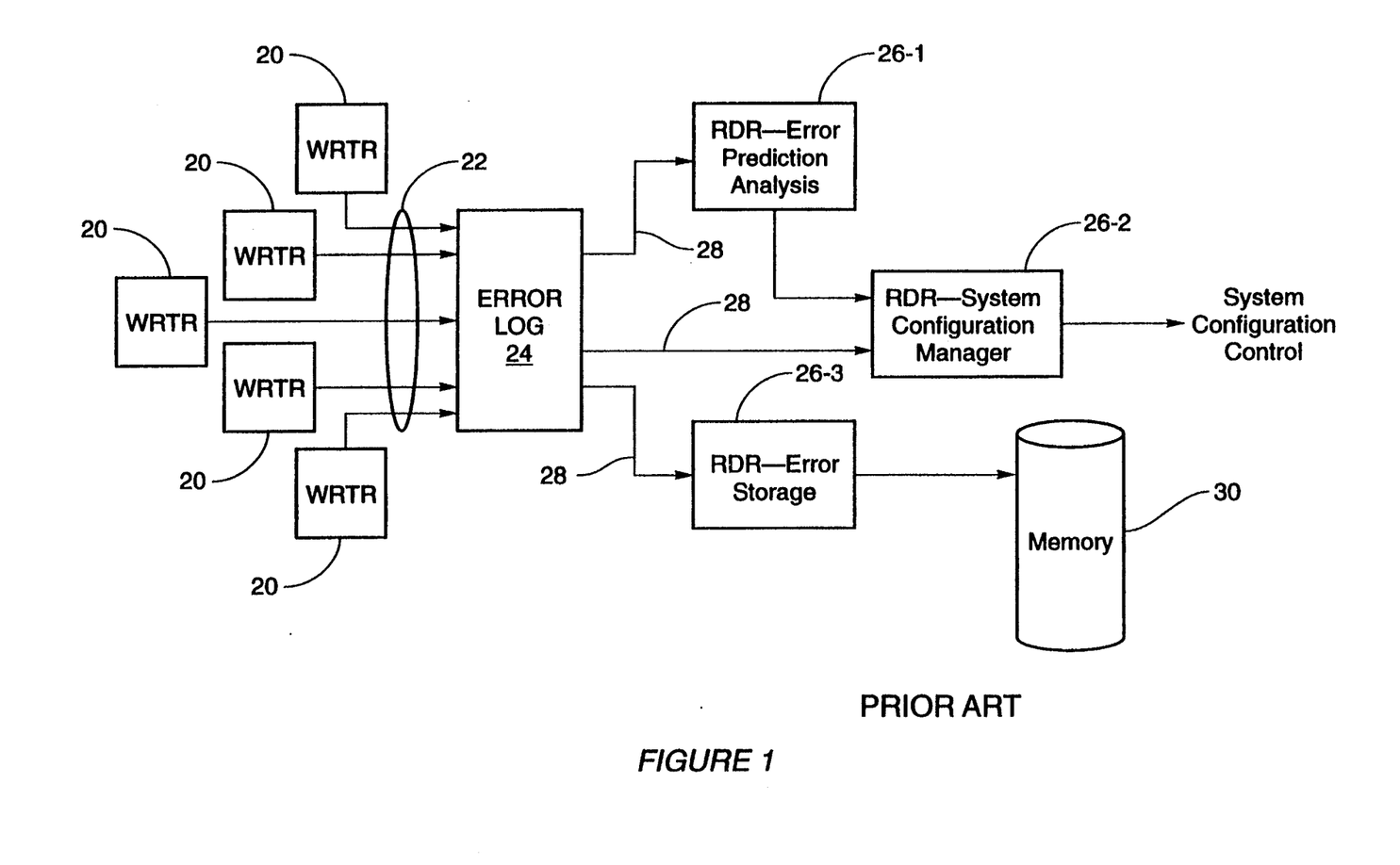
FIG. 1 is a block diagram illustrating the passage of messages from writer processes to reader processes.

FIG. 1, for example, illustrates exemplary interprocess communication of messages pertaining to error handling. Multiple first processes 20 can run in a computer. Each of the first processes 20 can act as a writer that produces a respective error message upon the occurrence of an error. As indicated by arrows 22, the first processes write the respective error messages to a data structure that acts as an error log 24. Multiple second processes 26, in turn, can read messages from the error log 24 as indicated by arrows 28. An error prediction process 26-1, for example, can use the error messages to perform predictive failure analysis, and a system configuration manager process 26-2 can alter system configuration based upon predicted errors. Also, for example, an error storage process 26-3 can store a record of errors in computer system memory 30.

Unfortunately, there have been shortcomings with earlier mechanisms for passing interprocess messages between writer processes and reader processes. For example, in one earlier message passing mechanism each message can be read by only one reader process; after the message has been read by one reader process it cannot be read subsequently by another reader process. In another earlier message passing mechanism, for example, multiple reader processes can access a message by behaving as a cooperating reading group, but only one cooperating reading group can access each message.

Thus, there has been a need for an apparatus and a method for passing messages from writer processes to reader processes that permits multiple readers to read multiple messages. Moreover, there has been a need for such an apparatus and method in which multiple cooperating reader groups can access multiple messages independently of each other.

SUMMARY OF THE INVENTION

The present invention provides an apparatus and method for passing messages between a writer process and multiple reader processes. The apparatus includes a storage buffer for storing a sequence of messages. An access device provides multiple points of access for the reader processes to messages stored in the storage buffer. For each of the multiple points of access, the access device sequentially provides access to the respective messages in the storage buffer.

The apparatus and method of the present invention advantageously provides access to messages stored in the storage buffer to multiple readers through multiple points of access. Each of the multiple points of access provides access to messages independently of the other points of access. Consequently, multiple readers can access messages in the storage buffer through multiple points of access.

These and other features and advantages of the present invention will be more apparent from the following description of an exemplary embodiment thereof, as illustrated in the accompanying drawings in which:

DESCRIPTION OF THE PREFERRED EMBODIMENT

The present invention comprises a novel message passing mechanism and an associated method. The following description is presented to enable any person skilled in the art to make and use the invention, and is provided in the context of the particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 7:
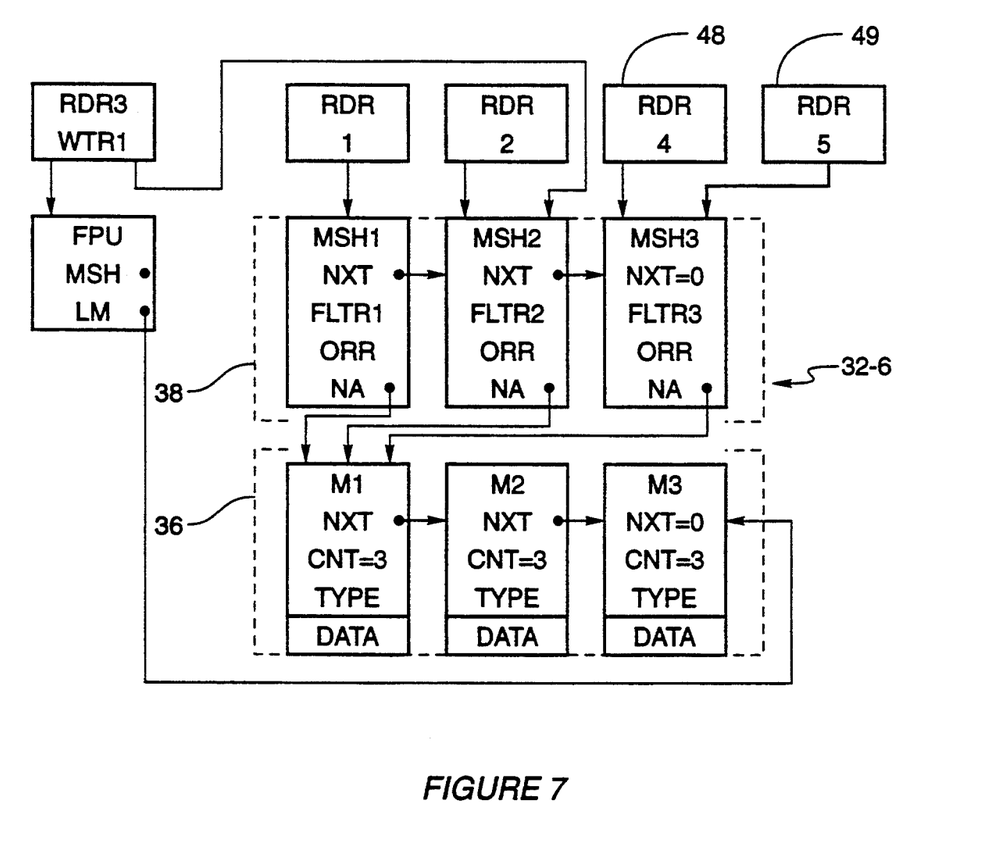

Referring to the block diagram of FIG. 7, there is shown an illustrative apparatus 32-6 in accordance with a present embodiment of the invention. The apparatus 32-6, which is implemented as a data structure, includes a first-in-first-out storage buffer 36, indicated by dashed lines, that stores messages M1, M2 and M3. An access mechanism 38, indicated by dashed lines, provides multiple points of access to the messages stored by the storage buffer 36.

More specifically, the apparatus 32-6 includes a function processor unit (FPU) 34. An FPU 34 is an object in a system that is visible to processes and that can be written to and read from. The access mechanism 38 provides three points of access to messages M1, M2 and M3 through respective first, second and third message stream headers (MSHs) 40, 42, and 44. The MSHs serve as points of access to messages in the storage buffer 36. The MSHs also keep track of the point of access to the messages in the storage buffer 36 for Readers and groups of cooperating readers registered on the MSHs as explained below. The three MSHs are functionally interposed between respective first through fifth Reader processes 45–49 and the three messages stored in the storage buffer 36. Messages M1, M2 and M3 are received by the FPU 34 from Reader/Writer process 47. Upon receipt, the messages are provided for storage in the message buffer 36.

Each of the Readers 45–49 is registered on a respective MSH. In accordance with a present embodiment of the invention, the respective Readers can access the messages M1, M2 and M3 only through the respective message stream headers on which they are registered. Furthermore, an access to a message does not always result in the reading (copying) of the message from the storage buffer 36. As explained below, where an access by a Reader does not result in a read, the access mechanism provides to the Reader access to the next message in the storage buffer 36. If there is no such next message, then the access mechanism 38 can queue an outstanding read request described below.

The first Reader 45 is registered on the first MSH 40. The second and third Readers 46, 47 are registered on the second MSH 42. The fourth and fifth Readers 48, 49 are registered on the third MSH 44. In operation, Reader/Writer process 47 writes messages to the storage buffer 36 through the FPU 34, and the Readers 45–49 access messages from the buffer 36 through MSHs 40, 42 and 44. It will be appreciated that although the process 47 registered on the FPU 34 is both a Reader and a Writer, such a process could alternatively be only a Writer without departing from the scope of the invention.

Figure 2:
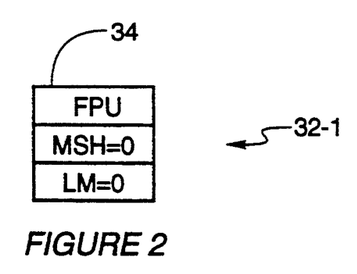
FIGS. 2–11 are block diagrams illustrating the method of development and operation of an apparatus in accordance with a presently preferred embodiment of the invention.
Figure 3:
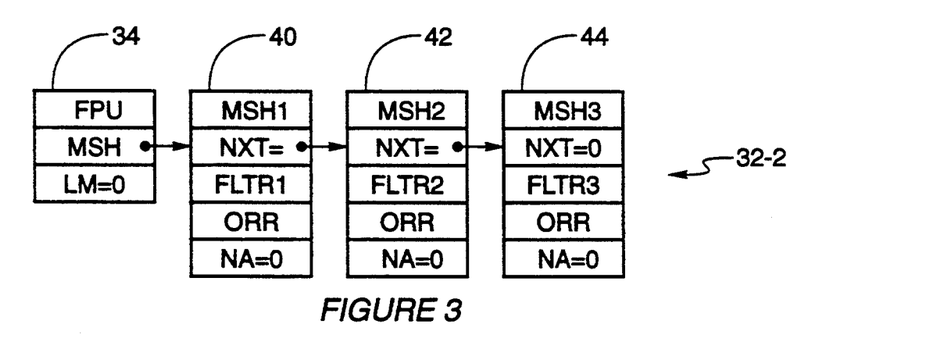

Through the illustrative block diagrams of FIGS. 2–11 and the flow diagrams of FIGS. 12–15, an exemplary message passing apparatus and a method in accordance with the present invention are described in detail. The drawings of FIGS. 2–11 show a sequence in the development and modification of a data structure apparatus using the steps illustrated in FIGS. 12–15. Referring to the diagram of FIG. 2, the apparatus 32-1 is shown to initially include only the FPU 34. In FIG. 3, the respective first, second and third MSHs 40, 42 and 44 have been added to the apparatus 32-2. The MSHs each contain respective Identifier fields: labelled MSH1, MSH2 and MSH3. They also contain respective filter fields labeled FLTR1, FLTR2 and FLTR 3, and they contain respective Next Access Pointer fields labeled, NA. The Identifier fields, filter fields and next address fields are loaded as explained below.

The FPU 34 contains a pointer, labeled MSH that points to MSH1. MSH1, MSH2 and MSH3 are coupled into a linked list by pointers labeled NXT. The reasons for linking the MSHs into a list, for example, is to locate a specific MSH identified by Reader that wishes to register on that MSH and additionally to search for outstanding read requests. The FPU 34 also includes a pointer field that contains a pointer labeled LM which is explained below.

Alternatively, for example, instead of arranging the messages in a linked list, the messages could have been placed in a circular buffer in which indexes, rather than pointers, were used to identify the next message in such a buffer. Also, for example, messages alternatively could be stored as objects in which pointers to such messages in fact are handles containing object identifiers.

Figure 12A:
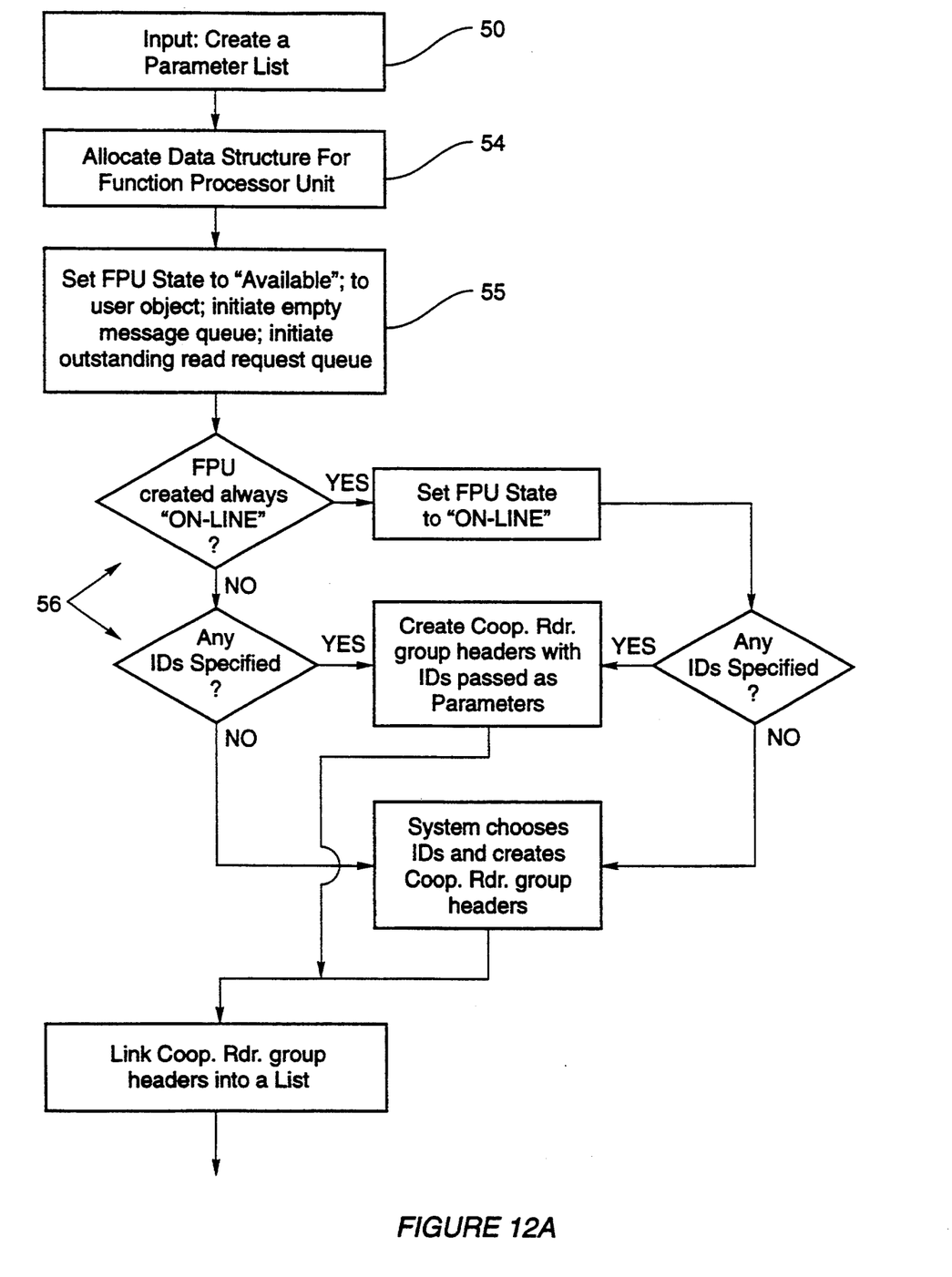
FIGS. 12A-B provide a flow diagram of the steps of creating a function processor unit and message stream headers of the apparatus of FIGS. 2–11.
Figures 12B, 13B:
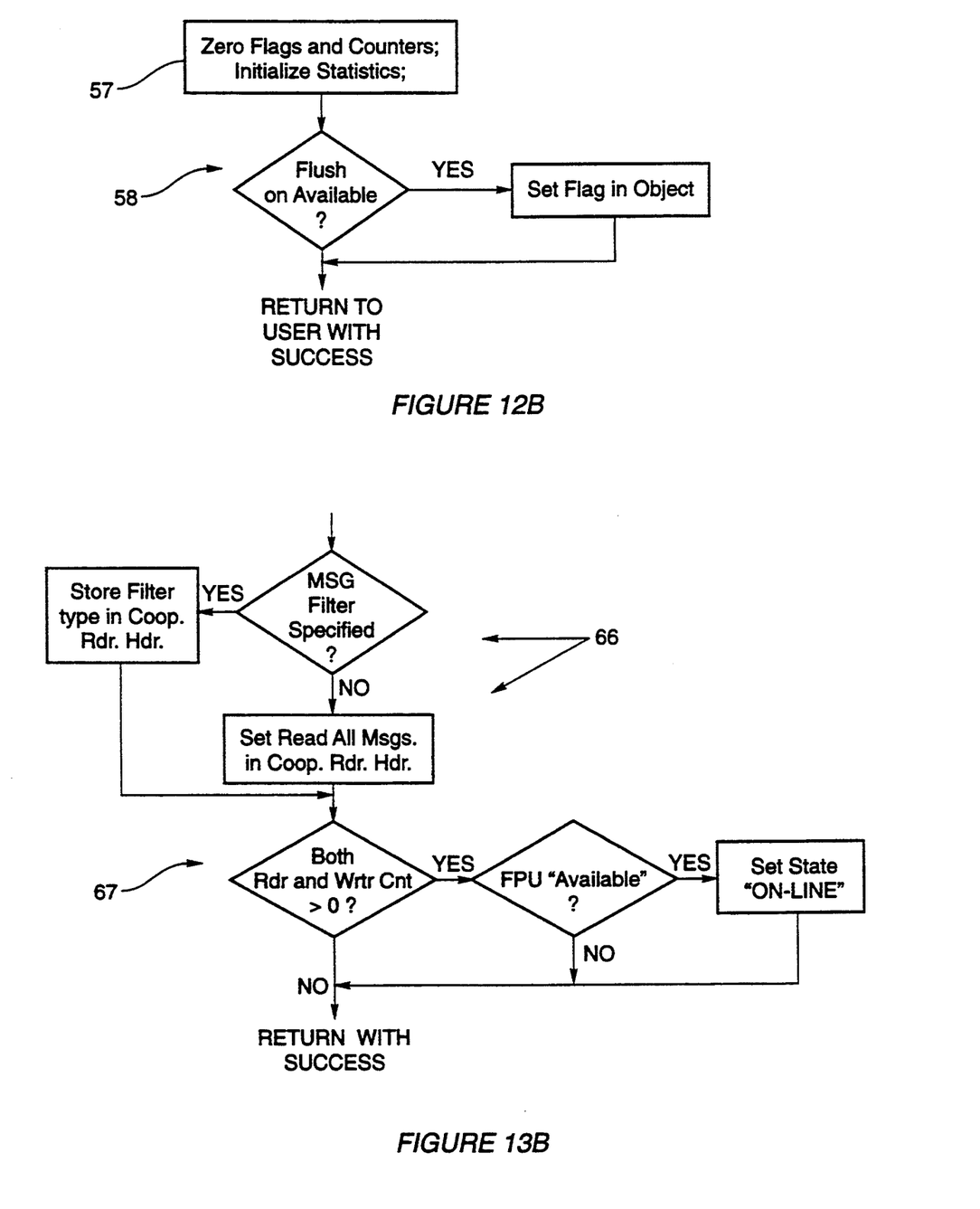
FIGS. 13A-B provide a flow diagram of the steps for registering a reader or writer process on the apparatus of FIGS. 2–11.

The flow diagram of FIGS. 12A-B illustrates the steps in producing the apparatus 32-1, 32-2 of FIGS. 2 and 3. In step 50, a call is made requesting the production of the FPU 34, and parameters are passed such as the identity of the FPU and the storage buffer size, for example. In step 54 a data structure is allocated from system pooled memory for the FPU 34. System pooled memory is the memory available for use by an operating system and applications. System pool can be allocated and deallocated.

In step 55, the FPU state is set to "Available." In the Available state, messages cannot be written to the FPU 34. An empty storage buffer is initialized, and an outstanding read request queue is initialized. In the steps indicated by arrows 56, a determination is made as to whether the FPU 34 is to be always in an "On-Line" state. In the On-Line state, messages can be written to the FPU even when no Readers are registered on the MSHs of the FPU. If the FPU is always to be "On-Line," then the FPU state is set to On-Line.

The Available state means that the FPU 34 cannot be written to or read from. The On-Line state means that the FPU 34 can be written to or read from. The two states control access to the FPU 34 so that system pool, which is a finite resource, is not consumed storing messages for which there are no potential Readers.

Also in the steps 56, the first, second and third MSHs 40, 42 and 44 are produced and linked. The Identifiers MSH1, MSH2 and MSH3 are stored in the respective MSHs. The Identifiers can be specified by the user or by the computer system. The Identifiers can be used later during registration of Readers to identify the MSH on which the Reader is to register.

In step 57, information used to control the operation of the FPU 34 is set. Such information could include counters, maximum message size and total storage buffer size where total buffer size is the total system pool that can be consumed by all messages in the storage buffer 36.

The flush on available flag, which can be set in step 57, causes all messages to be flushed when all readers leave the FPU 34, and the FPU changes state from On-Line to Available.

Quota is used to control the amount of system pool that can be used by an FPU 34 for its storage buffer 36. The use of quota ensures that processes using an FPU to pass messages do not use excessive amounts of system pool to the detriment of overall system operation including other FPUs (where a system uses system pool, for example, for data structures, buffers, temporary storage and mapping).

A maximum amount of system pool, a quota, is set for an FPU when the FPU is created. This quota is decremented by the size of messages written to the FPU, and it is incremented by the size of messages deallocated from the FPU. A message can be written to an FPU only when the FPU possesses sufficient quota to allocate system pool for the message.

Figure 4:
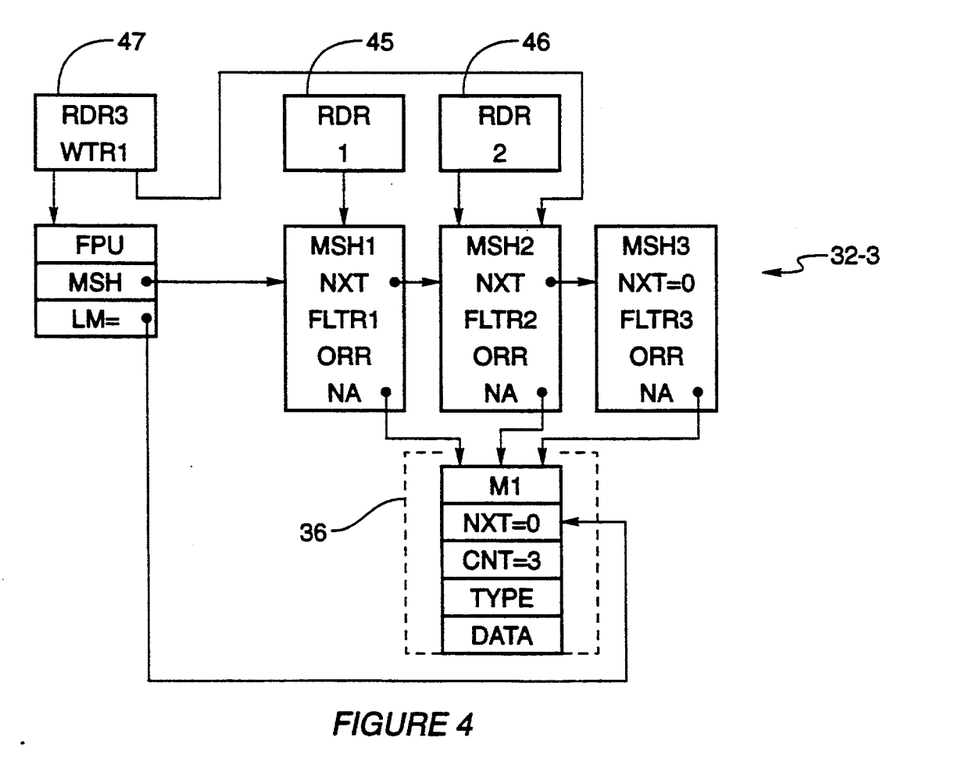

FIG. 4 illustrates a data structure apparatus 32-3 that results when the operations described below are performed on the data structure apparatus 32-2 of FIG. 3. The first Reader process 45 registers on the first MSH 40 and respective second and third Reader processes 46 and 47 register on the second MSH 42. Writer process 47 also registers on the FPU 34. As mentioned above, the process labelled 47 is both a Reader process and a Writer process.

After registration of the first, second and third Readers 45, 46 and 47, the Writer 47 requests a write of message M1 to the storage buffer 36 of the FPU 34. Next Access (NA) pointers of the first, second and third MSHs are loaded with pointers to M1. For each MSH, the respective NA Pointer points to the next point of access that can be provided by the respective MSH into the storage buffer 36. For the data structure apparatus 32-3, all three MSHs have the same next point of access, namely at M1. The Last Message (LM) field of the FPU 34 also is loaded with a pointer to M1. The LM pointer points to the last (most recent) message stored in the storage buffer 36.

Thus, for the data structure apparatus 32-3 of FIG. 4, the first Reader 45 can have access to M1 through the first MSH 40. Either the second or third Reader 46 or 47 can have access to M1 through the second MSH 42. The third MSH 44 also can provide a point of access to M1, but no readers have yet registered on the third MSH 44.

Message M1 has stored with it message TYPE information which, as discussed below, is used to determine which readers can actually read M1. It also has stored with it a reader count (CNT) which is a number indicating the number of MSHs that can be used to gain access to M1. In accordance with a presently preferred embodiment of the invention, each MSH created before the writing of a message, such as M1, to the storage buffer 36 can access a message only once. In the case of M1, the count is set to CNT=3 which means that M1 can be accessed only three times, once for each MSH.

Figure 13A:
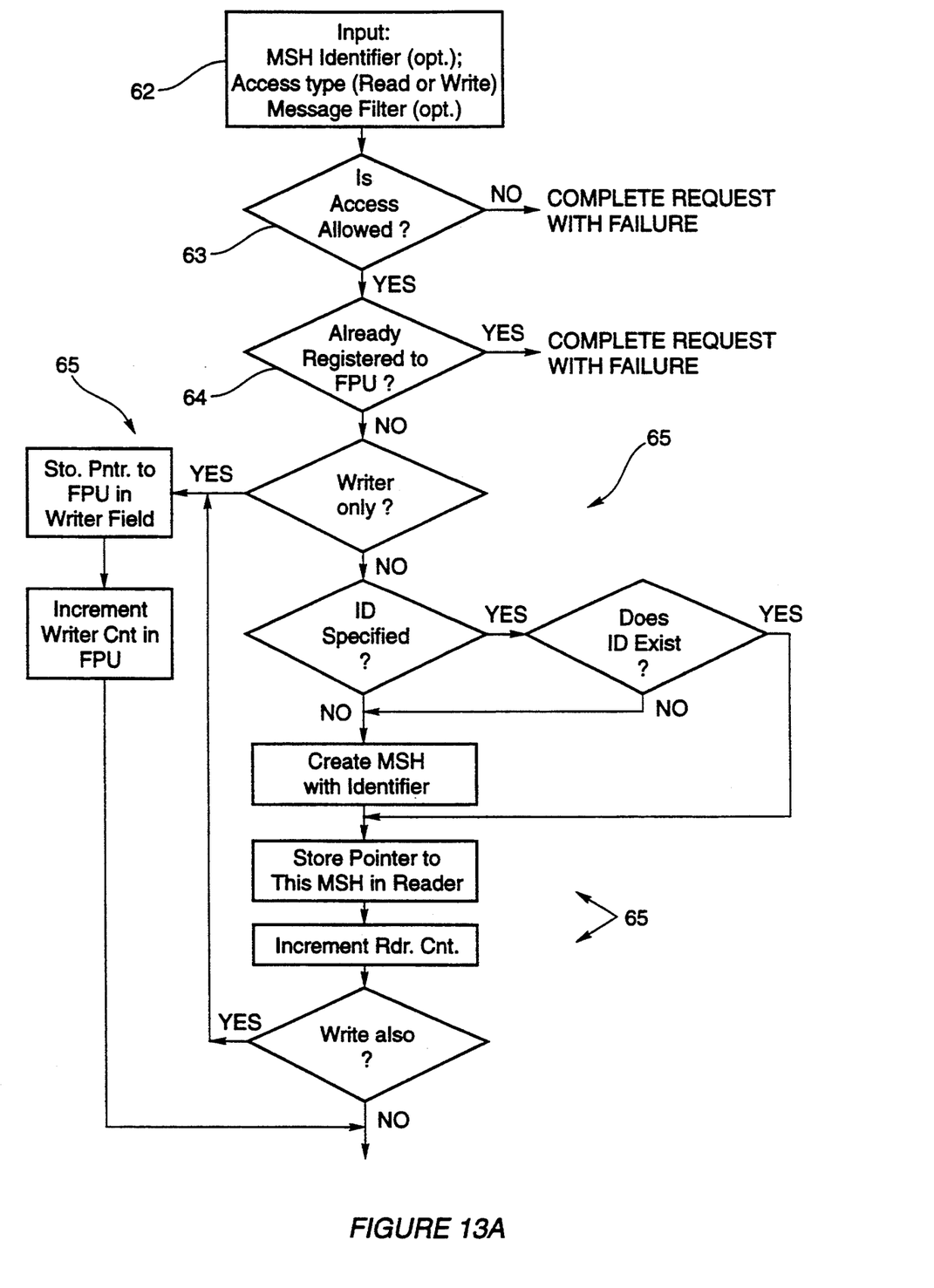

The flow diagram of FIGS. 13A-B illustrates the steps in the registration of Writer processes and Reader processes on the FPU 34 and the MSHs 40, 42 and 44. In step 62 a Reader process seeking registration makes a call that specifies the MSH Identifier of the MSH on which registration is sought. As explained below, a registering Reader can identify an existing MSH or create a new one.

Also, in step 62, a registering Reader can specify a filter (FLTR) to be used by the MSH on which the Reader registers. For example, the registering Reader may wish to read (copy) only messages pertaining to certain types of errors such as disk errors, and may not wish to read (copy) other types of messages such as messages concerning tape errors. A filter (FLTR) permits such particularized reads. Referring to FIG. 4, for example: FLTR 1 in the first MSH 40 filters messages accessed by the first Reader 40; FLTR 2 in the second MSH 42 filters messages accessed by the second and third Readers 46, 47; and FLTR 3 filters messages accessed through the third MSH 44.

Furthermore, in step 62, the registering process specifies whether it is a reader or writer. In step 63, a security check is made to determine whether the requesting process is entitled to the requested access. In step 64, a check is made to determine whether the requesting process already has registered.

In the steps indicated by the arrows labeled 65, in the case of a registering writer, a pointer is stored in the writer process to the FPU 34 so that the writer can locate the FPU and the storage buffer to which messages are to be written. Also in steps 65, the Writer Count in the FPU 34 is incremented by one. In the case of a registering reader process, a pointer is stored by the registering reader that points to the MSH on which the Reader is to register. The MSH can be specified by an Identifier specified by the Reader process that corresponds to an Identifier stored in that MSH. If no MSH exists with an Identifier that corresponds to the Identifier specified by the Reader process then a new MSH is created with either an Identifier specified by the registering Reader or, if none, an Identifier specified by the system. Also, in the case of a registering reader, the Reader count in the FPU is incremented by one.

In the steps indicated by arrows 66, a filter (FLTR) specified by a registering Reader is stored in the filter field of the MSH on which the Reader is to register. If no filter is specified, then the Reader can read any message accessed through the MSH on which the Reader registers regardless of the message type.

In a presently preferred embodiment, if two or more Readers register on a single MSH, and the Readers specify different Filters, then the Filter of the first Reader to register is used. Of course, an alternate rule for selecting from among multiple possible Filters can be employed without departing from the invention.

In the steps indicated by arrow 67, the state of the FPU 34 is changed from "Available" to "On-Line" if both the Reader Count and the Writer Count in the FPU exceed zero. Finally, in the steps indicated by arrow 68, readers waiting to read messages and writers waiting to write messages are notified of any FPU state change resulting from the previous steps.

Figure 14:
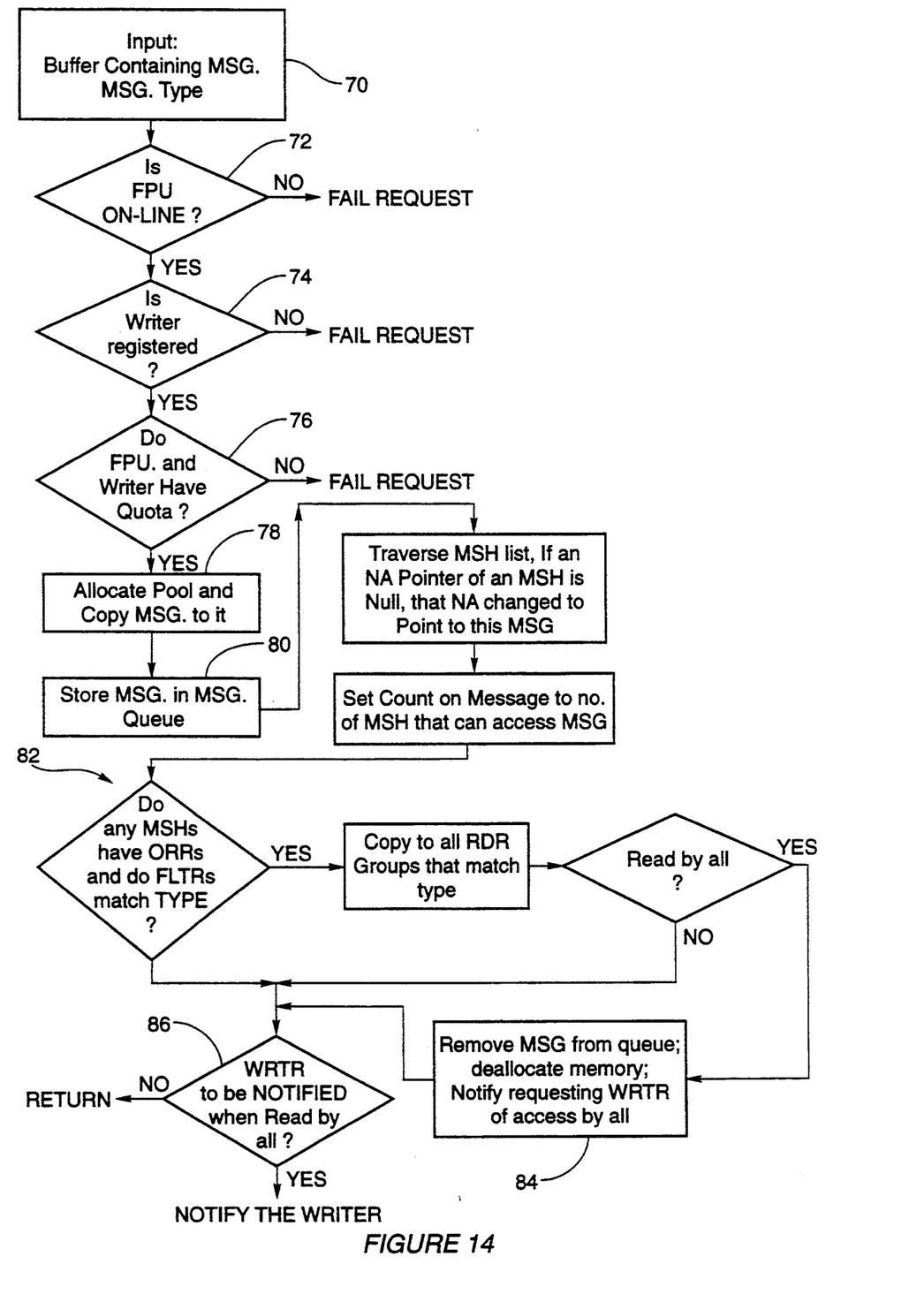
FIG. 14 provides a flow diagram of the steps of writing a message to the apparatus of FIGS. 2–11.

The illustrative flow diagram of FIG. 14 explains the steps in writing a message, such as message M1, to the FPU 34. In step 70, a buffer containing the message to be written and its message type (TYPE) are identified to the FPU 34. In steps 72, 74 and 76, the write request is denied unless the FPU is On-Line, and the writer is registered. In step 78, memory is allocated to store the message, and in step 80, the message is stored in the storage buffer 36 as M1.

In steps 82, any outstanding read requests, which are discussed more fully below, are satisfied. If, after satisfying all outstanding read requests, the message has been accessed by all eligible readers, then the message is not put into the storage buffer queue, and the write request is completed.

Figure 5:
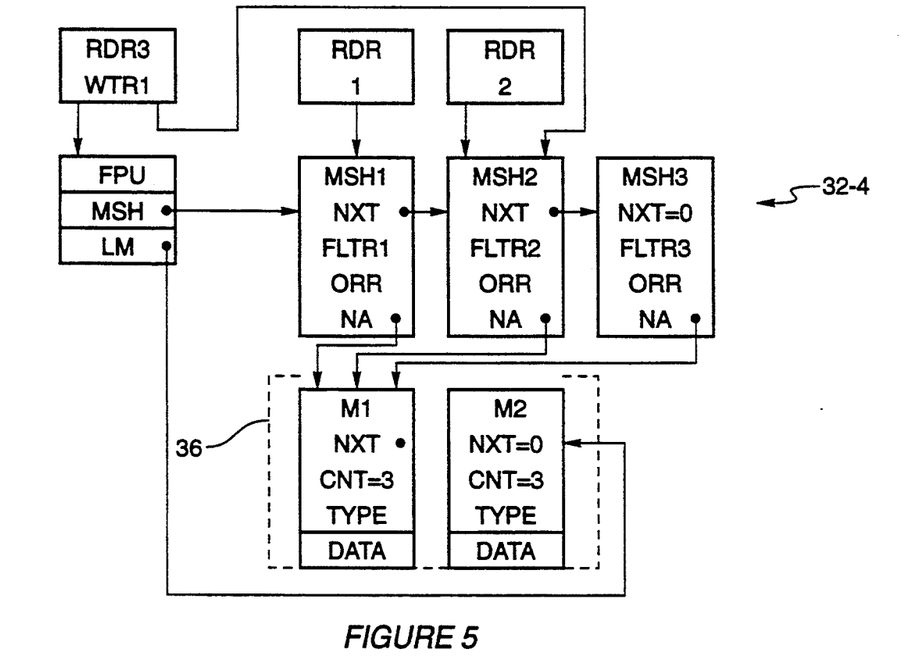

FIG. 5 illustrates an apparatus 32-4 that results when operations described below are performed on the apparatus 32-3 of FIG. 4. A second message, M2, is written to the storage buffer 36 of the FPU 34. A Next Message pointer (NXT) in M1 is loaded with the pointer to M2. The Last Message (LM) pointer of the FPU 34 is loaded with a pointer to M2, since M2 now is the last (most recent) message in the buffer 36. The count field of M2 stores a count CNT=3 which is the number of MSHs that can provide access to M2. M2 also includes a field that stores the message type (TYPE) of M2.

Figure 6:
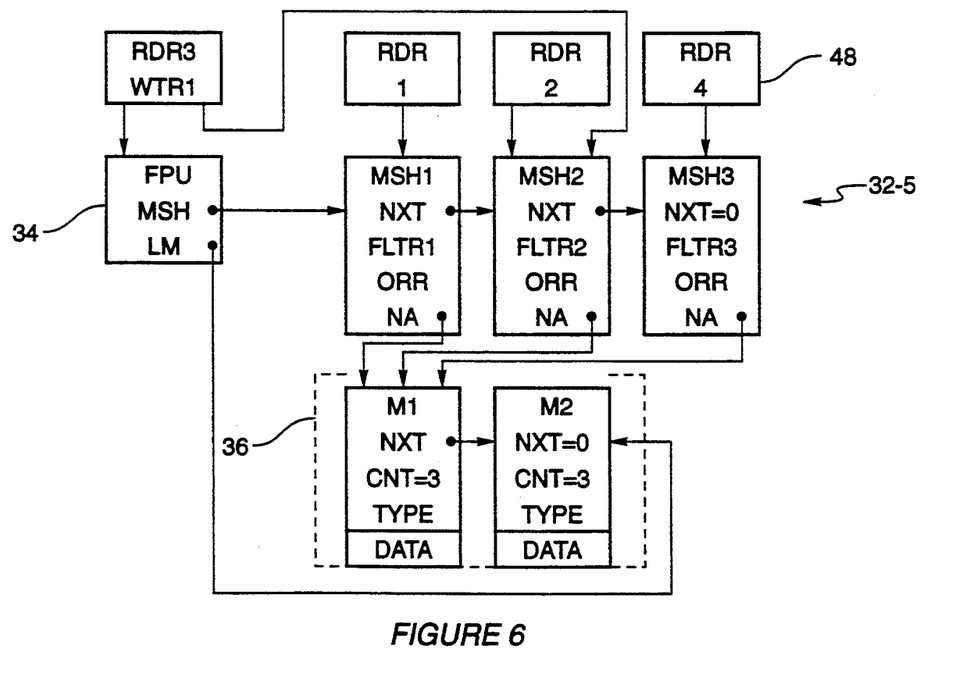

In the apparatus 32-5 of FIG. 6, a fourth Reader 48 has registered to the third MSH 44. Since the Next Access (NA) pointer of the third MSH 44 points to M1, the fourth Reader 44 can access M1 through the third MSH 44.

In FIG. 7, a third message M3 has been received by the FPU 34 from Reader/Writer 47, and a fifth Reader 49 has registered on the third MSH 44. The LM pointer of the FPU 34 has changed to point to the most recently received message M3, and the next message pointer, NXT, of M2 also has been changed to point to M3. The count field of M3 contains CNT=3. M3 also stores its message TYPE.

Still referring to FIG. 7, in accordance with the invention, the first Reader 45 can access M3 through the first MSH 40. Also, either the second Reader 46 or the third Reader 47, but not both, can access M3 through the second MSH 42. Finally, either the fourth Reader 48 or the fifth Reader 49, but not both, can access message M3 through the third MSH 44. For each access of M3, the message TYPE stored with M3 determines whether or not the access results in the actual reading (copying) of M3 to the accessing Reader.

As explained below, during each access by a reader, the message TYPE is compared with the FLTR of the MSH on which that Reader is registered. If there is a match then the accessed message is read. If there is no match, then the accessed message is not read, and the MSH provides, to the accessing Reader, access to the next message in the storage buffer 36.

Figure 8:
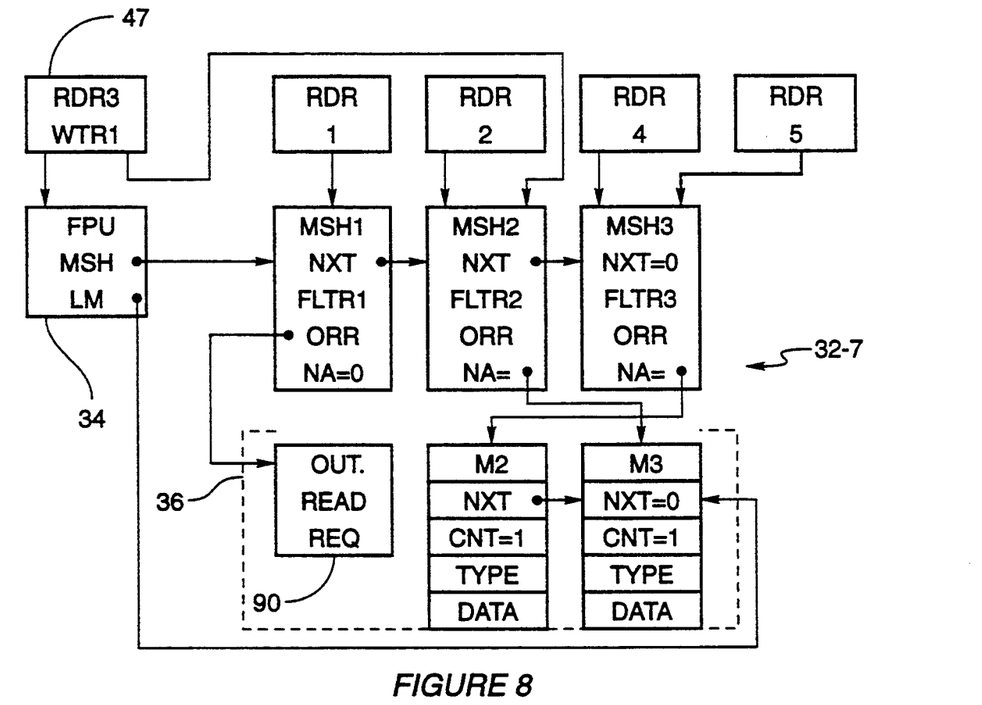

In FIG. 8, the first Reader 45 has accessed messages M1, M2 and M3, but has not read any of these three messages because for each message, the filter, FLTR 1, of the first Reader 45 failed to match the respective message TYPE of the accessed message. Thus, upon accessing M1, the NA pointer for the first MSH 40 was changed to point to M2, and the count of M1 was decremented to CNT=2. Since the message TYPE of M1 did not match FLTR1, the first Reader 45 did not read M1, but instead it accessed M2. Upon accessing M2, the NA pointer for the first MSH 40 was changed to point to M3, and the count of M2 was decremented to CNT=2. Since the message TYPE of M2 did not match FLTR1, the first Reader 45 did not read M2, but instead accessed M3. Upon accessing M3, the NA pointer for the first MSH 40 was changed to point to null, and the count of M3 was decremented to CNT=2. A pointer in an Outstanding Read Request (ORR) Field of the first MSH 40 was changed to point to an Outstanding Read Request 90.

The second Reader 46 has accessed M1 and M2. The message TYPE of M1 did not match the filter, FLTR2, of the second MSH 42, and the second Reader 42, therefore, did not copy M1. Thus, upon access to M1 by the second Reader 42, the NA Pointer of the second MSH 42 was changed to point to M2, and the count of M1 was decremented to CNT=1. Since the message TYPE OF M2 matched the filter, FLTR2, of the second MSH 42, the second Reader 46 read (copied) M2. The NA pointer of the second MSH 42 was changed to point to M3, and the count of M2 was decremented to CNT=1.

Furthermore, in FIG. 8 the fifth Reader 49 has accessed Mi. The message type of M1 matched FLTR 3 of the third MSH 44. Thus the fifth Reader 49 read M1. The NA pointer of the third MSH 44 was changed to point to M2. The count of M1 was decremented to CNT=0.

Still referring to FIG. 8, after the first, second and fifth Readers 45, 46, 49 accessed M1, the Reader count of M1 was CNT=0. Thus, M1 had been accessed by all readers that could access it. Consequently, M1 was deallocated and is not shown in FIG. 8.

It will be appreciated that, in accordance with a presently preferred embodiment of the invention, an MSH can provide no more than one access per message regardless of the number of readers registered on the MSH. Thus, since the second Reader 46 accessed M1 and M2, the third Reader 47, which also is registered on the second MSH 42 together with the second Reader 36, is precluded from accessing either M1 or M2.

Figure 15A:
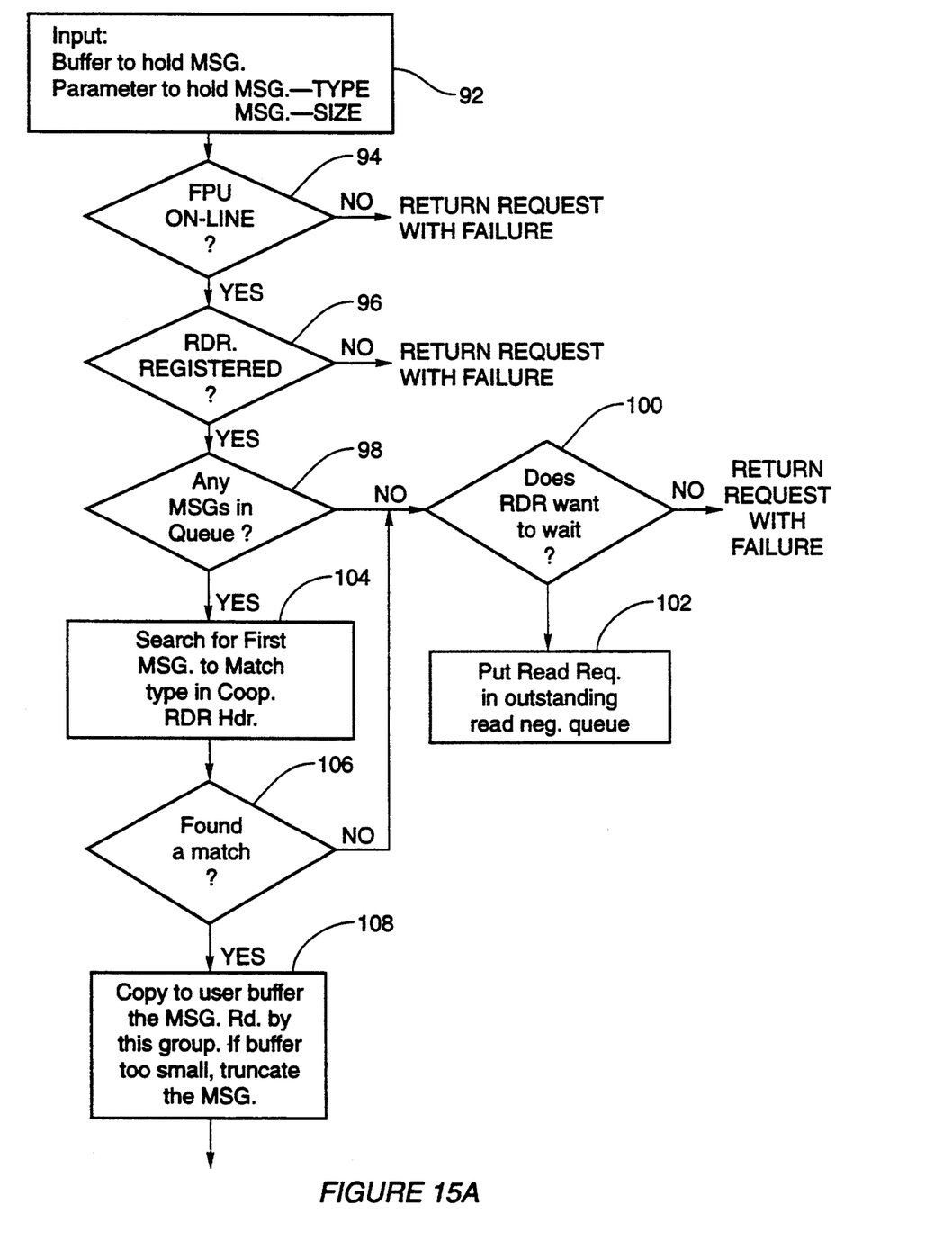
FIGS. 15A-B provide a flow diagram of the steps of reading a message from the apparatus of FIGS. 2–11.
Figure 15B:
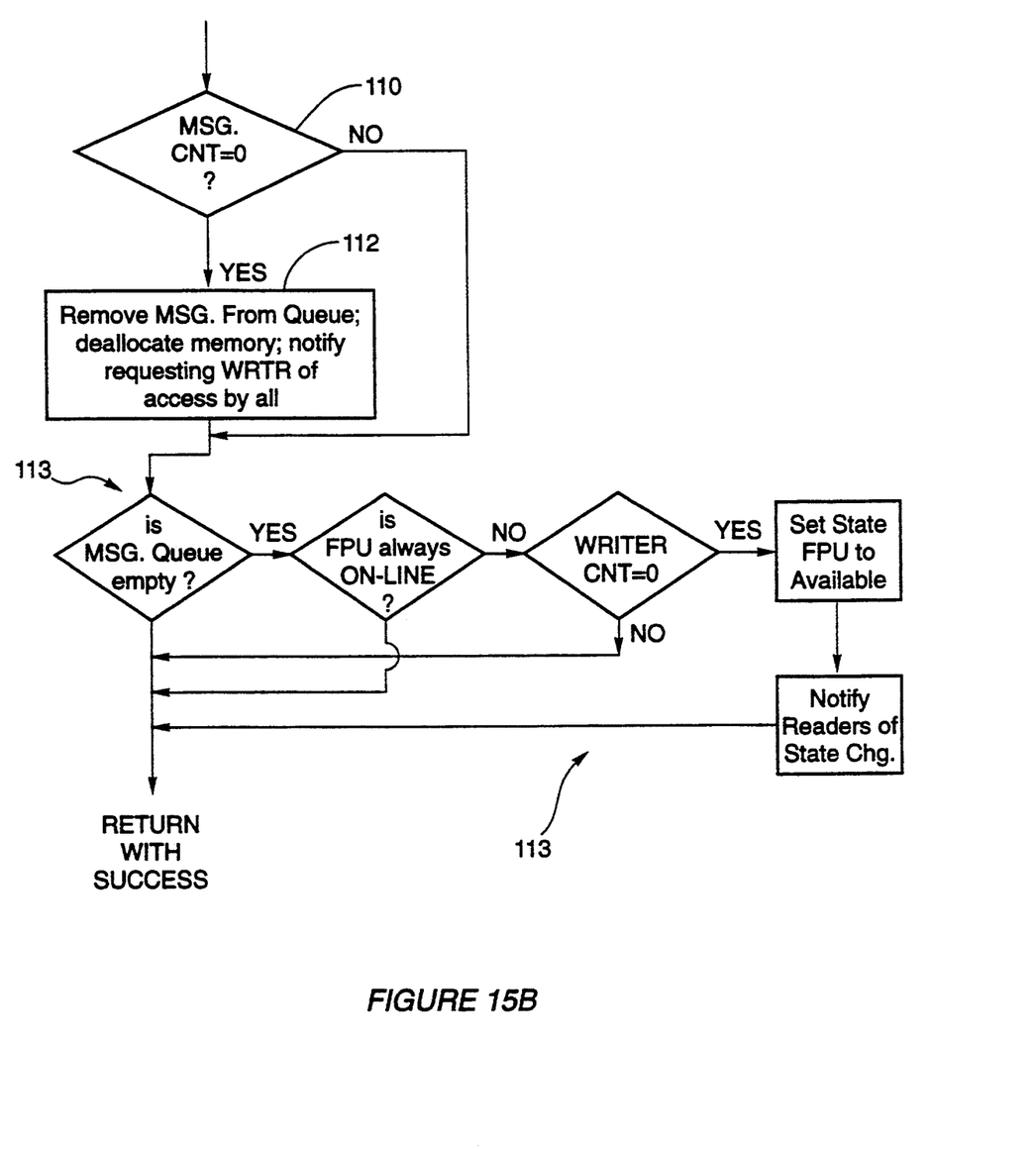

The flow diagram shown in FIGS. 15A-B illustrates the steps in reading a message. At step 92 a Reader identifies a buffer associated with the Reader requesting the read to which the message can be copied. As indicated in steps 94 and 96, unless the FPU 34 is in the On-Line State and the requesting Reader is registered, the read request fails. In step 98, the storage buffer 36 is checked to determine whether there are messages accessible to the requesting Reader.

A message is accessible to the requesting Reader if the next access (NA) pointer of the MSH to which the requesting Reader is registered points to a message in the buffer. There can be cases in which a requesting Reader is registered on an MSH containing an MSH that does not point to any message in the storage buffer. For example, the sixth Reader 51 shown in FIG. 10, sixth Reader 51 is registered on the fourth MSH 53 which contains an NA pointer that does not point to any message. In such cases, no messages are accessible to the requesting reader. If there are no accessible messages, and a requesting Reader does not wish to await the receipt of a message, then at step 100, the read request fails. If, however, there are no messages accessible, and a requesting Reader does wish to await the receipt of a message, then at step 102, the read request is placed in the Outstanding Read Request (ORR) queue as shown in FIG. 8.

Although the ORR queue in a presently preferred embodiment is associated with MSHs, it could alternatively be associated with the FPU without departing from the scope of the invention.

If there are messages accessible to a requesting Reader in the storage buffer 36, then at step 104 the requesting Reader accesses the first accessible message in the buffer 36 to determine whether it has a message TYPE that matches the filter (FLTR) of the MSH on which the Reader is registered. The first accessible message is the first message pointed to by the NA pointer of the MSH on which the requesting Reader is registered. The message TYPE of the accessed message is compared with the FLTR in the MSH on which the requesting Reader is registered. A next message (NXT) pointer of the accessed message is used to identify the next message in the buffer 36 to be accessed. The next access (NA) pointer of the MSH to which the requesting Reader is registered is changed to point to the next message in the buffer 36 to be accessed, and the Count in the accessed (but unread) message is decremented. If the message TYPE of the accessed message matches the filter, FLTR, of the requesting Reader, then the message is read. The message count is decremented. If the decremented count is CNT=0 then the message is deallocated as explained below. If the message was not read and the count does not equal zero, then search step 104 continues until either a message is found in which the message TYPE matches the FLTR of the MSH on which requesting Reader is registered, or until all accessible messages have been accessed.

If a matching message is found, then at step 108 the message is copied into the identified buffer of the requesting reader. If all accessible messages are accessed without finding a matching message, then at step 106 the procedure flow passes back to step 100.

If after the message accesses described in relation to FIGS. 15A-B any of the accessed messages are no longer accessible to any other readers (i.e., the message CNT=0 after such access), then at step 112 those messages are removed from the storage buffer 36. At steps 113, the FPU 34 state is changed from On-Line to Available if the Writer count is zero, the message queue in the storage buffer 36 is empty and the FPU 34 was not created in the always On-Line state.

Figure 9:
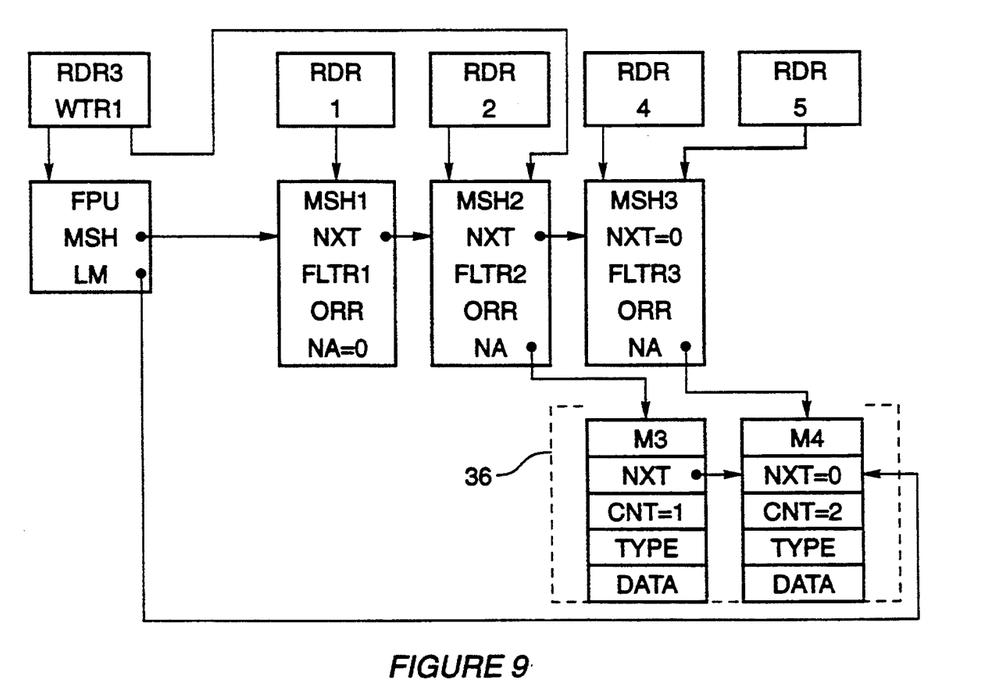

FIG. 9 illustrates the data structure apparatus 32-8 that results after Reader/Writer 47 writes M4 to the storage buffer 36 and M2 and M3 are accessed as described below. The message TYPE of M4 matches FLTR1 of the first MSH 40. So, the outstanding read request 90 of the first Reader 45 shown in FIG. 8 is satisfied. Since, after satisfying the outstanding Read request, there are only two MSHs that can access M4, the second and third MSHs 42 and 44, the Reader count of M4 is set to CNT=2.

The fourth Reader 48 accesses M2. The filter of the third MSH 44 does not match the message TYPE of M2. So, the NA pointer of the third MSH 44 is changed to point to M3, and the count of M2 is decremented to CNT=0. Since no more MSHs can access M2, it is deallocated. The filter of the third MSH 44 matches the message TYPE of M3. Thus, the fourth Reader reads M3. The NA pointer of the third MSH 44 changes to point to M4, and the count of M3 is decremented to CNT=1.

Figure 10:
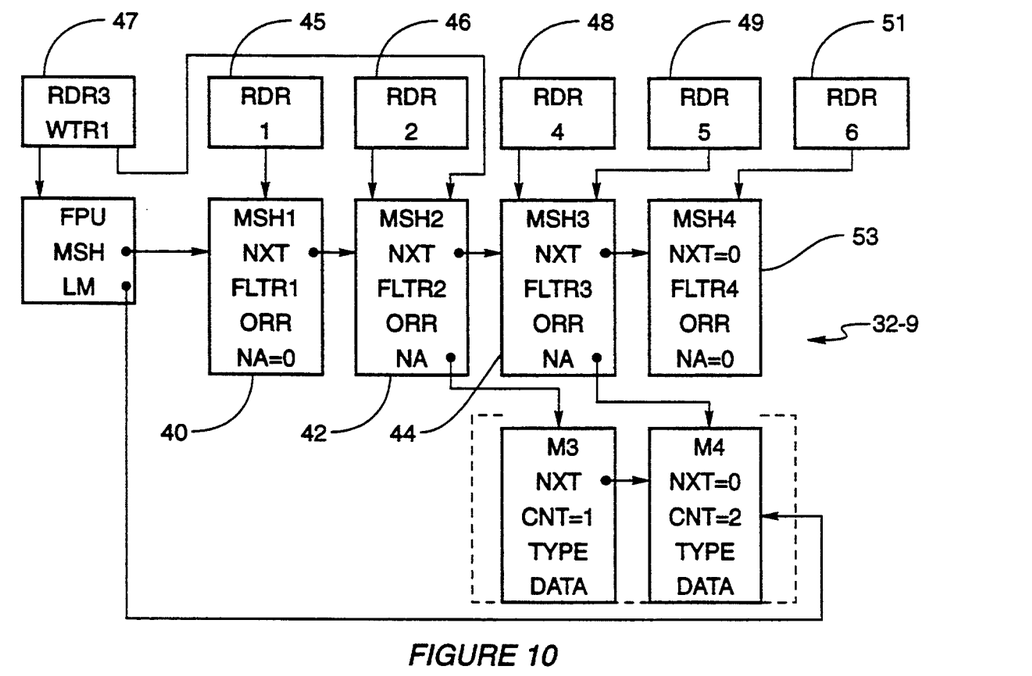

FIG. 10 illustrates the apparatus 32-9 that results when the fourth MSH 53 is created, and a sixth Reader 51 registers on the fourth MSH 53. In accordance with a presently preferred embodiment of the invention, no MSH can provide access to a message written to the storage buffer 36 before the creation of that MSH. Thus, the sixth MSH 53 cannot provide access to M3 or M4. This is indicated by the fact that the NA pointer of the fourth MSH 53 is zero, indicating that it does not point to any message.

From FIG. 10, it will be appreciated that the present invention permits the reading of messages to be synchronized with the writing of messages. Messages such as M3 and M4, written before the registration of the fourth MSH 53, cannot be accessed by that later-registered reader.

Figure 11:
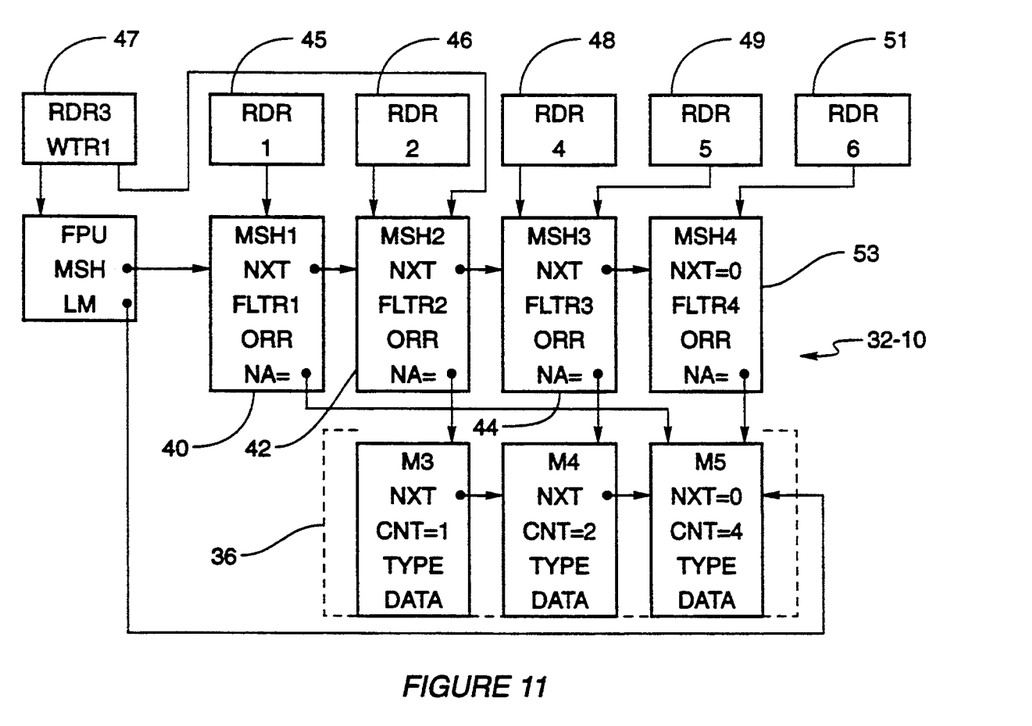

Referring to FIG. 11, message M5 has been written into the storage buffer 36 by Reader/Writer process 47. M5 can be accessed by all four MSHs. Thus, the count stored in M5 is CNT=4. The NA pointer of the first MSH 40 is changed to point to M5, and the NA pointer of the fourth MSH 53 also is changed to point to M5. The LM pointer of the FPU 34 is changed to point to M5. Finally, the NM pointer of M4 is changed to point to M5.

It will be appreciated that the message passing described herein has been among processes. It will be understood that message passing can occur between threads of execution without departing from the invention.

Thus, while the present invention has been described with reference to a specific embodiment, the description is illustrative of the invention and is not to be construed as limiting the invention. Various modifications may occur to those skilled in the art without departing from the true spirit and scope of the invention as defined by the appended claims, in which:

What is claimed is:

1. A method of storing and distributing messages in a data processing system, the steps of the method performed by said data processing system, comprising:

establishing a message queue that stores messages in a computer memory in an order sequence, said message queue having a beginning and an end;

providing a multiplicity of reader interfaces to said message queue, each reader interface accessing all the messages stored in said message queue in sequence starting at the beginning of said message queue, such that each message stored in said message queue is accessed only once by each reader interface, running at least one writer process, said at least one writer process generating messages;

storing each message generated by said at least one writer process at the end of said message queue;

running a multiplicity of reader processes;

coupling each reader process to one of said multiplicity of reader interfaces such that each reader interface is coupled to at least one of said reader processes;

each reader process prompting the reader interface coupled thereto to access a next one of said messages in said message queue and to pass a copy thereof to said reader process; and each reader interface, in response to said prompting by said at least one reader process coupled thereto, passing a copy of a next one of said messages stored in said message queue to a reader process coupled to said reader interface that first prompts said reader interface, and then preventing access to said next one of said messages by any other reader processes coupled to said reader interface, such that each message stored in said message queue is accessed by exactly one of said at least one reader processes coupled to each said reader interface.

2. The method of claim 1, further characterized by said data processing system performing the steps of:

storing in said computer memory data representing the total number of said multiplicity of reader interfaces;

recording in said computer memory data corresponding to the number of accesses to each message of said message queue;

deleting a first message at the beginning of said message queue when said first message has been accessed a number of times equal to the number of said multiplicity of reader interfaces.

3. The method of claim 2, further characterized by said data processing system performing the steps of:

storing in said computer memory a respective message type identifier for each respective message stored in said message queue;

storing in said computer memory, for at least one said reader interface, a respective filter definition denoting one or more of said message type identifiers;

screening each one of said messages in said message queue accessed by said at least one reader interface having a respective stored filter definition to determine whether said message type identifier matches said stored filter definition; and passing a copy of said one accessed message to said at least one reader process coupled thereto only when said one accessed message has a stored message type identifier matching said respective stored filter definition.

4. The method of claim 1, further characterized by said data processing system performing the steps of:

storing a respective message type identifier for each respective message stored in said message queue;

storing, for at least one said reader interface, a respective filter definition denoting one or more of said message type identifiers;

screening each one of said messages in said message queue accessed by said at least one reader interface having a respective stored filter definition to determine whether said message type identifier matches said stored filter definition;

passing a copy of said one accessed message to said at least one reader process coupled thereto only when said one accessed message has a stored message type identifier matching said respective stored filter definition.

5. The method of claim 4, further characterized by said data processing system performing the steps of:
- storing in said computer memory a count value for each respective message stored in said message queue, said stored count value indicating a maximum number of times that said respective message can be accessed;
- whenever any one of said multiplicity of reader interfaces accesses one of said messages stored in said message queue, decrementing said count value stored for said one accessed message; and
- deleting each respective message stored in said message queue when said count value stored for said respective message is decremented to a value of zero.

6. The method of claim 1, further characterized by said data processing system performing the steps of:
- storing in said computer memory a count value for each respective message stored in said message queue, said stored count value indicating a maximum number of times that said respective message can be accessed;
- whenever any one of said multiplicity of reader interfaces accesses one of said messages stored in said message queue, decrementing said count value stored for said one accessed message; and
- deleting each respective message stored in said message queue when said count value stored for said respective message is decremented to a value of zero.

7. The method of claim 1, wherein said coupling step includes coupling a plurality of said reader processes to one of said reader interfaces.

8. The method of claim 3, wherein said coupling step includes coupling a plurality of said reader processes to one of said reader interfaces.

9. The method of claim 5, wherein said coupling step includes coupling a plurality of said reader processes to one of said reader interfaces.

* * * * *